United States Patent
Blumenau et al.

(10) Patent No.: US 9,562,278 B2
(45) Date of Patent: Feb. 7, 2017

(54) DEVICE FOR STRIP GUIDANCE IN A HOT MEDIUM (I)

(71) Applicants: Cerobear GmbH, Herogenrath (DE); Thyssenkrupp Steel Europe AG, Duisburg (DE)

(72) Inventors: Marc Blumenau, Hagen (DE); Frank Eisner, Chemnitz (DE); Christopher Gusek, Iserlohn (DE); Fred Jindra, Lennestadt (DE); Rudolf Schoenenberg, Daphine, AL (US); Bert-Reiner Willeke, Lennestadt (DE); Tobias Denner, Herzogenrath (DE); Christian Klatt, Aachen (DE); Jens Wemhoener, Aachen (DE)

(73) Assignee: Thyssenkrupp Steel Europe AG (DE)

( * ) Notice: Subject to any disclaimer, the term of this patent is extended or adjusted under 35 U.S.C. 154(b) by 284 days.

(21) Appl. No.: 13/261,971

(22) PCT Filed: Apr. 11, 2013

(86) PCT No.: PCT/DE2013/100135
§ 371 (c)(1),
(2) Date: Oct. 14, 2014

(87) PCT Pub. No.: WO2013/152764
PCT Pub. Date: Oct. 17, 2013

(65) Prior Publication Data
US 2015/0068454 A1    Mar. 12, 2015

(30) Foreign Application Priority Data
Apr. 12, 2012    (DE) .................. 10 2012 103 132

(51) Int. Cl.
*C23C 2/00*    (2006.01)
*F16C 13/02*   (2006.01)
*F16C 25/08*   (2006.01)

(52) U.S. Cl.
CPC ............ *C23C 2/003* (2013.01); *F16C 13/024* (2013.01); *F16C 25/083* (2013.01); *F16C 2326/58* (2013.01)

(58) Field of Classification Search
CPC ...... C23C 2/00; C23C 2/003; B21B 2031/023; B21B 2031/026; B21B 2031/028; F16C 13/02; F16C 23/08; F16C 19/49; F16C 19/52; F16C 19/525; F16C 19/545; F16C 35/06; B05C 3/12; B05C 3/125; B05C 3/132
(Continued)

(56) References Cited

U.S. PATENT DOCUMENTS

| | | | | |
|---|---|---|---|---|
| 3,091,217 A | * | 5/1963 | Seymour | F16C 33/043 118/420 |
| 5,099,780 A | * | 3/1992 | Nappier | B05C 3/125 118/33 |
| 5,538,558 A | * | 7/1996 | Ookouchi | C23C 2/003 118/419 |
| 5,538,559 A | * | 7/1996 | Kleimeyer | F16C 33/04 118/419 |

(Continued)

FOREIGN PATENT DOCUMENTS

| | | |
|---|---|---|
| DE | 19608670 | 9/1997 |
| WO | WO9211398 | 7/1992 |
| WO | WO2006002822 | 1/2006 |

*Primary Examiner* — Jason L Vaughan
(74) *Attorney, Agent, or Firm* — David C. Purdue

(57) ABSTRACT

The invention relates to a device for strip guidance in a hot medium, comprising a deflection roller (3, 38) mounted on supporting arms (1, 2, 34, 37, 54, 57) and a carrier device holding the supporting arms (1, 2, 34, 37, 54, 57). The device is characterized in that one of the supporting arms (1, 2, 34, 37, 54, 57) is mounted on the carrier device by means of a floating bearing (5), wherein the floating bearing (5) allows the mounted supporting arm on the carrier device to (Continued)

Figure 1:
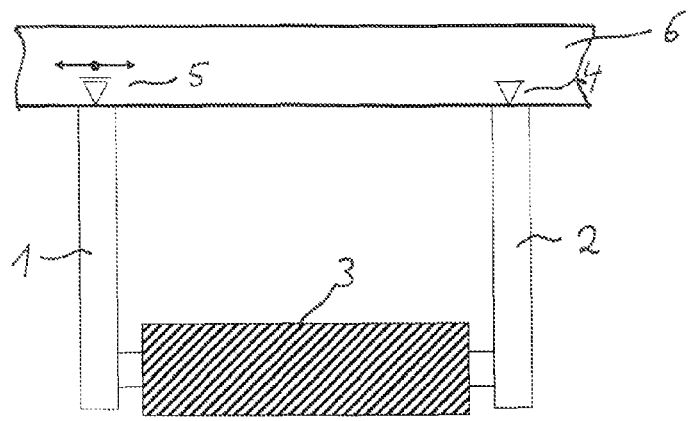

move parallel to the longitudinal direction of the deflection roller (3, 38), and in that an elastic counter element (12), which acts parallel to the longitudinal direction of the deflection roller (3, 38) upon the supporting arm (1, 2, 34, 37, 54, 57) mounted on the floating bearing (5), is present and counteracts an increasing distance between the supporting arms (1, 2, 34, 37, 54, 57). In this way, the technical problems of offsetting a temperature-induced length change of the deflection roller and avoiding an uncontrolled movement of the system are solved.

24 Claims, 5 Drawing Sheets

(58) Field of Classification Search
 USPC .................................................. 118/423, 419
 See application file for complete search history.

(56) References Cited

U.S. PATENT DOCUMENTS

| | | | |
|---|---|---|---|
| 6,261,369 B1 * | 7/2001 | Morando | C23C 2/00 |
| | | | 118/419 |
| 6,554,904 B1 | 4/2003 | Gimpel et al. | |
| 6,926,773 B2 * | 8/2005 | Plaetzer | C23C 2/00 |
| | | | 118/419 |
| 7,156,920 B2 * | 1/2007 | Plaetzer | C23C 2/003 |
| | | | 118/419 |
| 7,175,711 B2 * | 2/2007 | Platzer | C23C 2/00 |
| | | | 118/419 |
| 8,500,336 B2 | 8/2013 | Kouscheschi et al. | |
| 8,635,969 B2 * | 1/2014 | Challaye | C23C 2/003 |
| | | | 118/400 |
| 2005/0223976 A1 | 10/2005 | Platzer | |

* cited by examiner

DEVICE FOR STRIP GUIDANCE IN A HOT MEDIUM (I)

The invention relates to a device for strip guidance in a hot medium having the features of the preamble of claim 1.

Devices of this type are used, for example, for the continuous hot-dip finishing of metal strips. The hot medium in this case is a coating bath of molten metal. A device of this type can also be used, however, for the hot treatment of a metal strip with steam or gas.

In hot-dip finishing, the metal strip is dipped into the coating bath, which is generally at a temperature of above 400° C., for several seconds. By way of example, a surface treatment of steel sheet with a corrosion-resistant coating based on a zinc alloy, aluminum alloy or zinc-aluminum alloy is used widely in industry. In this process, the strip to be coated is guided via one or more deflection rollers, which are dipped in the coating bath mounted on supporting arms. The supporting arms are held above the coating bath on a carrier device, for example a cross-member. Since parts of the supporting arm, the entire deflection roller and also the bearing point of the deflection rollers in the supporting arms dip into the coating bath, these elements are exposed to high thermal and mechanical stresses and also material attack by the aggressive molten bath. In this case, the bearing point of the deflection roller on the supporting arms experiences the greatest wear.

The wear can result in unsettled running of the strip and markings on the strip surface, and these can impair the surface quality of the treated metal strip considerably. In the worst case, a fracture can also arise in the region of the bearing point of the deflection roller, and this means not only a significant interruption in ongoing operation but also a hazard for the operating personnel. In order to avoid impairment of the surface quality produced or material failure, the device is replaced as soon as possible when there is evidence of a strong degree of wear, but this is inevitably associated with a system downtime of several hours. Replacement of the device is moreover costly.

EP 1518003 B1 discloses a device for strip guidance of the type mentioned in the introduction, in which the deflection roller is mounted with roller journals in a plain bearing. The carrier device for the supporting arms consists of two holding elements which are physically separated from one another and each hold a supporting arm. It is disclosed to provide, for the plain bearing, a ceramic sleeve with sliding surfaces for the respective roller journal. The supporting arms each have a wear-resistant run-up plate made of ceramic, against which the roller journal can run up in the axial direction in the case of a temperature-induced linear expansion. A gap is provided between the ends of the roller journal and the respective run-up plate and can absorb a thermally induced change in length of the deflection roller without the supporting arms thereby being subjected to mechanical loading perpendicularly to the linear extent thereof. It is disadvantageous, however, that the gap can permit an uncontrolled movement of the deflection roller, as long as the roller journals do not strike against the supporting arms. If, by contrast, the clearance between the roller journals and the stop on the supporting arms is too small, considerable mechanical loading can arise and the supporting arms may be bent up. This problem is not addressed in the prior art.

DE 196 08 670 A1 discloses a bearing system for a deflection roller in the molten metal bath, in which ball bearings are arranged in each case on the roller journals, the osculation of which ball bearings between the raceways of the race rings and the balls is greatly reduced. The bearings are therefore suitable predominantly for supporting the radial forces. A clearance is provided between the roller journals and run-up plates made of cemented carbide provided on the supporting arms to accommodate a linear expansion of the deflection roller. A ceramic ball is arranged in each case in the center of each roller journal. Owing to the clearance between roller journal and run-up plate, the problem addressed above in relation to the deflection roller possibly being unstably mounted in the axial direction or in relation to a high level of loading of the supporting arms by the expanding deflection roller is likewise present here.

EP 2159297 B1 discloses a further device for strip guidance as per the preamble of claim 1. The carrier device for the supporting arms here too consists of two holding elements which are physically separated from one another and are fixed to the border of the bath. The deflection roller is mounted in the region of the roller journals by means of a rolling bearing, which can have an entirely ceramic form. The roller journals provided with a protective coating can slide in the rolling bearings in the axial direction. A run-up plate is provided on the supporting arm and serves for bearing in the axial direction. As in the prior art explained above, a clearance is provided between the run-up plate and the end of the roller journal and can accommodate a temperature-induced change in length of the deflection roller.

WO 2006/002822 A1 discloses a device for strip guidance in which the deflection roller is mounted on a shaft fixed fixedly in terms of rotation on the supporting arms. This bearing system is encapsulated with respect to the molten bath, with gaps in the region of parts moving against one another being sealed off against the inlet of molten material by means of electrical induction. The supporting arms are fixed above the molten bath on a cross-member, with the possibility of being adjusted along the cross-member.

It is therefore an object of the invention to provide a device of the type mentioned in the introduction enabling on the one hand, to absorb a change in length of the deflection roller and on the other hand to avoid uncontrolled movements of the system.

This object is achieved by the characterizing features of claim 1. Advantageous embodiments are indicated by the dependent claims.

Accordingly, it is proposed to mount one of the supporting arms on the carrier device by means of a floating bearing, wherein the floating bearing allows the supporting arm mounted thereby on the carrier device to move parallel to the longitudinal direction of the deflection roller. Furthermore, provision is made of an elastic counterelement, which acts parallel to the longitudinal direction of the deflection roller, acts on the supporting arm mounted on the floating bearing and counteracts an increasing distance between the supporting arms. The counterbearing can in this case act indirectly or directly on the supporting arm.

The floating bearing enables a change in distance between the supporting arms in a direction parallel to the longitudinal axis of the deflection roller. With this solution, temperature-induced changes in length of the deflection roller do not lead to up bending of the supporting arms, but instead are absorbed by a change in distance between the supporting arms.

The elastic counterelement avoids an uncontrolled movement of the supporting arm mounted on the floating bearing. This is particularly advantageous when using a deflection roller which is mounted via roller journals on the supporting arms. The clearance in the axial direction between roller journals and supporting arms which is known in the prior art for absorbing thermal expansion of the deflection roller can be kept, small or else can be avoided completely. In particular, provision can be made to allow the roller journals, at least during the heating phase and the insertion in the molten material, to rest permanently against stop plates arranged on the associated supporting arms. In the event of an increase in temperature, the thermal expansion of the deflection roller is absorbed by the floating bearing of the supporting arms on the carrier device. The elastic counterbody acting on the floating bearing ensures that the corresponding supporting arm can also rest permanently indirectly or directly axially on the roller journal of the deflection roller and axially supports the deflection roller, as a result of which an uncontrolled axial movement of the deflection roller between the supporting arms is prevented.

This is particularly advantageous for the transfer of the device from storage at room temperature to a preheating furnace, which heats the device up to a temperature close to that of the hot medium, e.g. of the molten bath. The floating bearing makes it possible for the distance between the supporting arms to concomitantly grow in accordance with the change in length of the deflection roller. The elastic counterbody in turn presses the supporting arms against the deflection roller and thereby keeps the device as a whole sufficiently stable at least for the transportation of the device and the dipping into the hot medium. Despite the large increase in temperature, the deflection roller can therefore be held without play in the axial direction between the supporting arms.

Provision can be made of a possibility to adjust the elastic counterelement in its position on the supporting arm in the direction of its longitudinal extent. The elastic force of the counterelement which acts on the supporting arm can therefore be varied. For assembly purposes, the elastic element can be removed from the supporting arm given appropriate adjustability.

The device according to the invention for strip guidance can also have more than one deflection roller on the same or on separate supporting arms, in which respect the features according to the invention can also be provided for the further deflection rollers. The further deflection rollers can serve, for example, as guide rollers for the strip to be treated. The further deflection rollers—if present—can likewise dip into the hot medium, e.g. into the coating bath, or in use can also remain without contact therewith.

The carrier device can be a cross-member. However, the invention can also comprise two holding elements which are physically separated from one another and each hold one of the supporting arms.

Furthermore, it can be advantageous to provide fixing means for fixing the supporting arm mounted via the floating bearing on the carrier device. Fixing of the supporting arm might be expedient in particular once the device has left the preheating furnace, i.e. immediately before dipping into the hot medium. Since the device, upon leaving the preheating furnace, has already been heated to close to the temperature of the hot medium, a significant linear expansion hereafter no longer arises. The fixing of the supporting arm no longer allows the deflection roller to perform any significant axial movement during dipping and during the coating operation, as a result of which it is possible to counter the particularly high levels of mechanical loading which are present during the dipping on account of the movement of the metal strip and to ensure settled running of the metal strip to be treated. While the supporting arm is fixed on the carrier device, the associated floating bearing and the elastic counterbody have no function. The supporting arm can also be fixed directly in the region of the floating bearing, which thereby becomes a locating bearing.

It can be advantageous to embody the device according to the invention in such a way that a supporting arm stop element adjustable in position is present for limiting the floating bearing movement. This does not provide complete fixing of the floating bearing, but rather merely a limitation for a movement which increases the distance between the supporting arms. Since the temperature of the hot medium is generally known from the outset, the position of the supporting arm stop element can already be suitably set before the heating operation in such a way that, when the maximum temperature is reached, the supporting arm mounted on the floating bearing butts indirectly or directly on the supporting arm stop element, such that the distance between the supporting arms cannot increase further.

The deflection roller, which for its part rests against the supporting arms, prevents a reduction of the distance. The system as a whole is therefore stable even after dipping into the hot medium.

The supporting arm stop element can also be positioned after the conclusion of the heating operation and before dipping into the hot medium.

The device according to the invention can also be embodied in such a way that the bearing point of the deflection roller on the supporting arms is unencapsulated. This avoids the relatively high outlay in conjunction with protective means that encapsulate the journal bearing from the hot medium and also the relatively high space requirement. Moreover, encapsulation is costly and may also be a source for a further need for repair.

Furthermore, the device according to the invention can be embodied in such a way that for the bearing point of the deflection roller at the supporting arms a ceramic journal bearing is provided. Like the deflection roller itself, the roller journal generally consists of metal. If use is made of a ceramic journal bearing and of roller journals made of a different material, e.g. metal, the different thermal expansion of the materials involved means that a bearing gap is to be provided in the radial direction between the journal bearing and the roller journal. This entails the risk that the hot medium, e.g. molten material, settles in the bearing gap, cools down when the device is removed from the hot medium, and solidifies, and therefore the external diameter of the roller journal is increased in the region of the journal bearing. In this way, the clearance between the journal bearing and the roller journal can be continuously reduced in the radial direction, until the clearance is no longer sufficient for the different coefficients of thermal expansion. The bearing may be destroyed. In order to counter this risk of an unencapsulated bearing, it may be advantageous to seal off the bearing gap against the penetration of the hot medium. In this respect, it may be advantageous to guide the journal bearing on the roller journal in a groove and to seal off the gap present in the axial direction between the lateral groove walls and the journal bearing against the penetration of the molten material.

This sealing-off operation can be effected, for example, by means of an elastic sealing disk which, for example, consists of graphite or comprises graphite.

The journal bearing can be a rolling bearing or else a plain bearing.

Furthermore, the device according to the invention can be embodied in such a way that impact bodies, e.g. made of ceramic, are fixed releasably to the roller journals for an axially oriented impact against the supporting arms. The contact between impact body and associated supporting arm is preferably permanent during operation of the device according to the invention, and therefore the deflection roller is mounted stably in the axial direction between the supporting arms. In this respect, the releasable fixing of the impact bodies can be implemented at least also by means of one or more screwed connections.

The journal bearing, which allows the deflection roller to rotate relative to the supporting arms, is to be secured in the supporting arms against tilting, twisting or release from a bearing receptacle of the supporting arm. Since the journal bearing preferably consists of ceramic and the supporting arms, by contrast, generally consist of a different material, for example metal, the heating of the device according to the invention can lead to different thermal expansions of the bearing receptacle in the supporting arm on the one hand and of the journal bearings on the other hand, and therefore the journal bearing possibly sits too loosely in the bearing receptacle. Therefore, it may be advantageous to secure the journal bearings in each case in the associated supporting arm by means of a non-positive lock or positive lock which engages on the outer edge of the journal bearing.

The device according to the invention can be formed in such a way that the journal bearing is secured by means of a clamping body which engages on the journal bearing and on the supporting arm. A clamping body of this type can have a higher coefficient of thermal expansion compared to the material of the supporting arm, and therefore the clamping action is also retained in the event of thermal expansion of the supporting arm. By way of example, a clamping body can consist of austenitic steel or high-grade steel. The variant in which the clamping body consists of austenitic steel can be used, for example, in the case of a supporting arm consisting of ferritic steel or high-grade steel, but is not limited thereto.

The clamping body can have a bar shape or an annular shape, for example.

Provision can also be made of a plurality of clamping bodies which act together and which all have higher coefficients of thermal expansion compared to the material of the supporting arm. Provision can also be made, however, of one or more clamping bodies, the coefficient of thermal expansion of which is the same as or lower than that of the material of the supporting arm, provided that one of the clamping bodies compensates for this in turn.

Instead of a higher coefficient of thermal expansion or in addition thereto, a clamping body, acting alone or together with (an) other clamping body (bodies), can have an alternative feature or a plurality of alternative features for bridging the different coefficients of expansion between the supporting arm and the journal bearing. A feature of this nature can be, for example, a wedge shape of the clamping body or of a part thereof. In the case of a widening bearing receptacle, the clamping action of a corresponding wedge piece can be retained by virtue of the fact that the wedge piece is pressed further into the bearing receptacle. The force required for the displacement of the wedge piece can be provided, for example, by a resilient element. The magnitude of the spring force in this case is to be such that, during the cooling process, the wedge piece can slide in a direction counter to the spring force of the elastic spring element, in order to avoid crushing of the journal bearing.

The clamping body if annular shaped can comprise an annular wedge piece of wedge-shaped cross section with a thickness which decreases in the axial direction. The wedge piece can engage indirectly or directly on the supporting arm and on the journal bearing to fix the latter one in the bearing receptacle by clamping.

As an alternative or in addition to one or more clamping bodies, at least one tie rod can be provided for securing against rotation. Here, the at least one tie rod can act between two separate supporting arm parts which form the bearing receptacle and can have a lower coefficient of thermal expansion than the material of the supporting arm.

Furthermore, as an alternative or in addition to one or more clamping bodies and/or to at least one tie rod, the journal bearing can be secured by a chamfer of the journal bearing receptacle of the supporting arm acting on the journal bearing in a positive-locking manner.

As an alternative or additional measure a positive lock can also be provided by extensions of the bearing outer ring engaging into grooves in the supporting arm.

Figure 2:
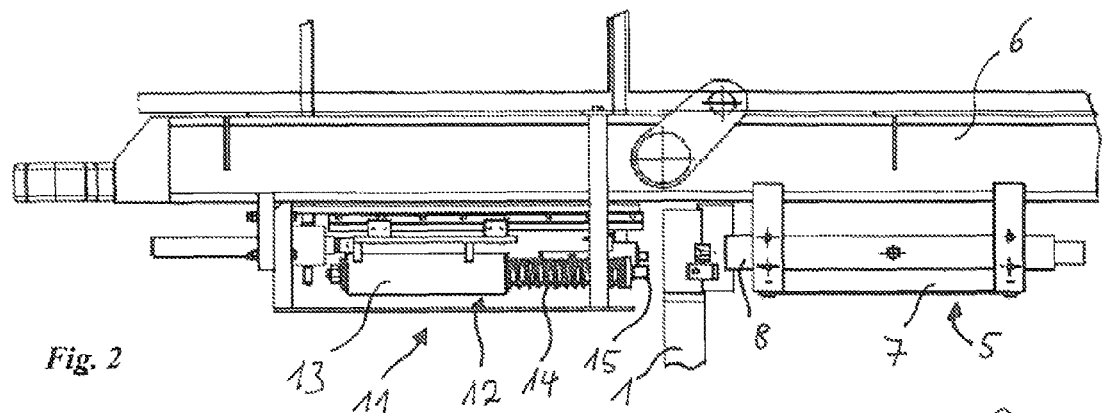
Figure 3:
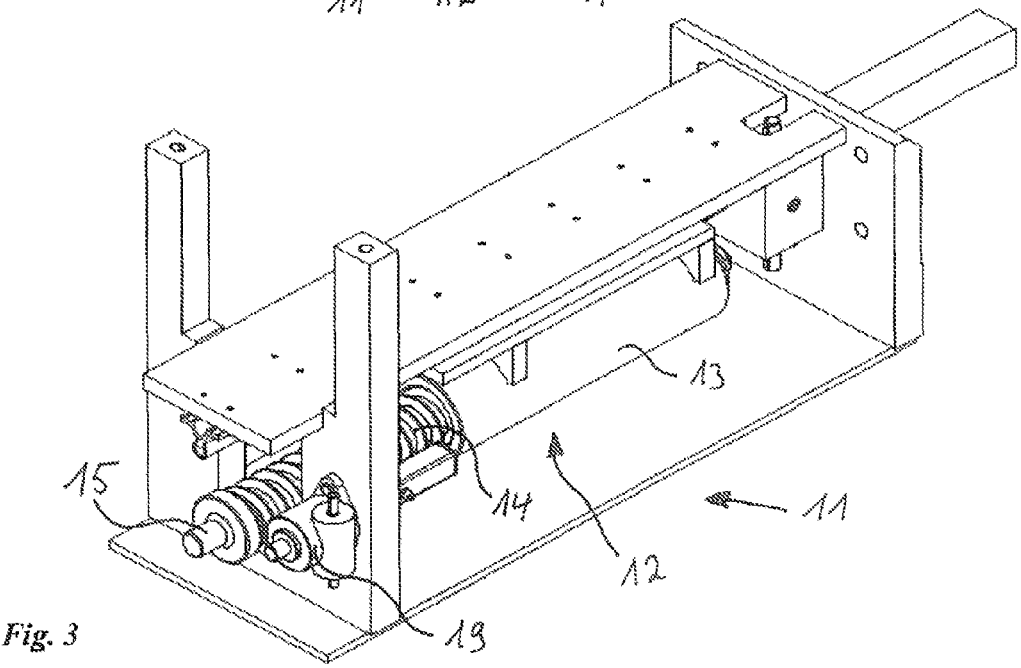
Figure 4:
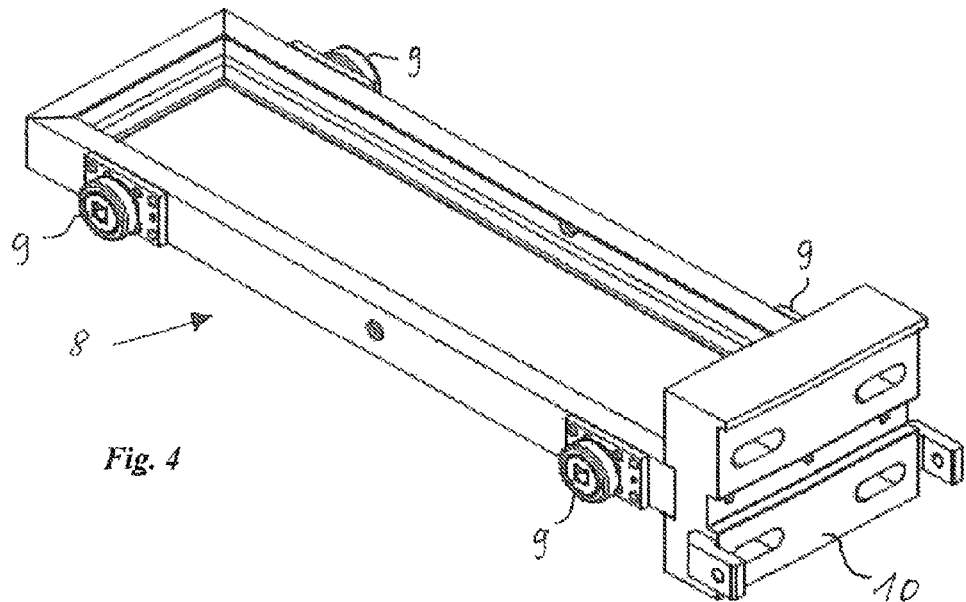
Figure 5:
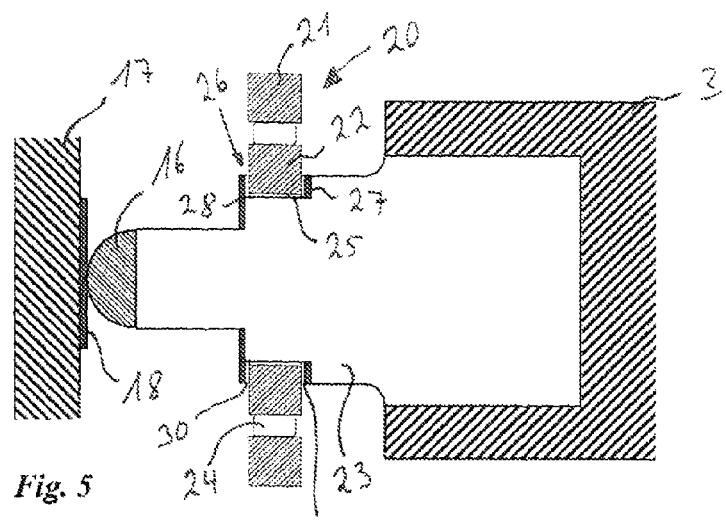
Figure 6:
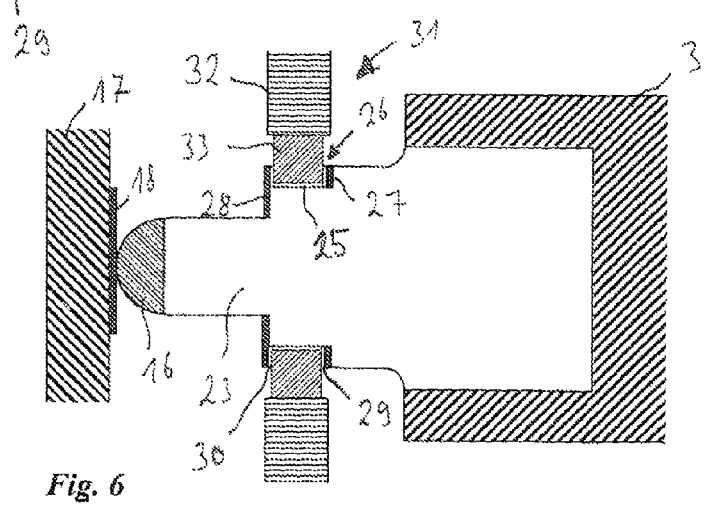
Figure 7:
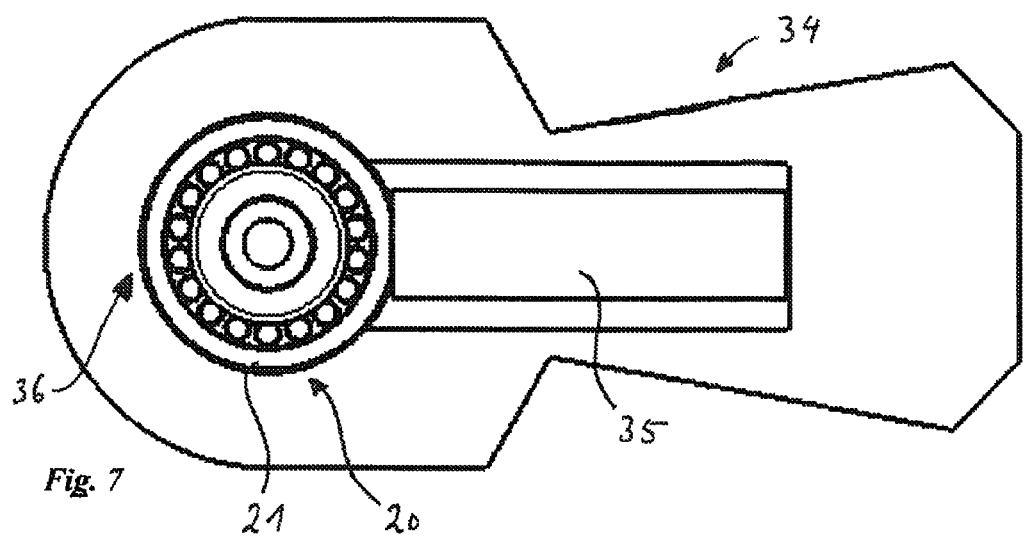
Figure 8:
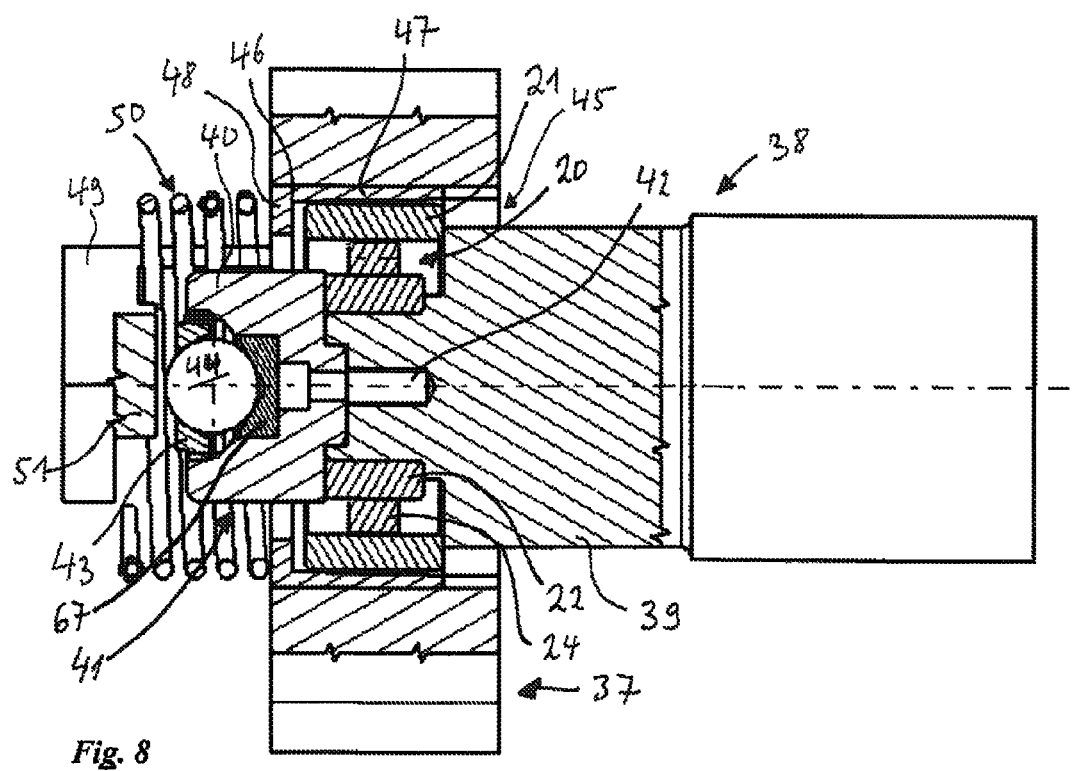
Figure 9:
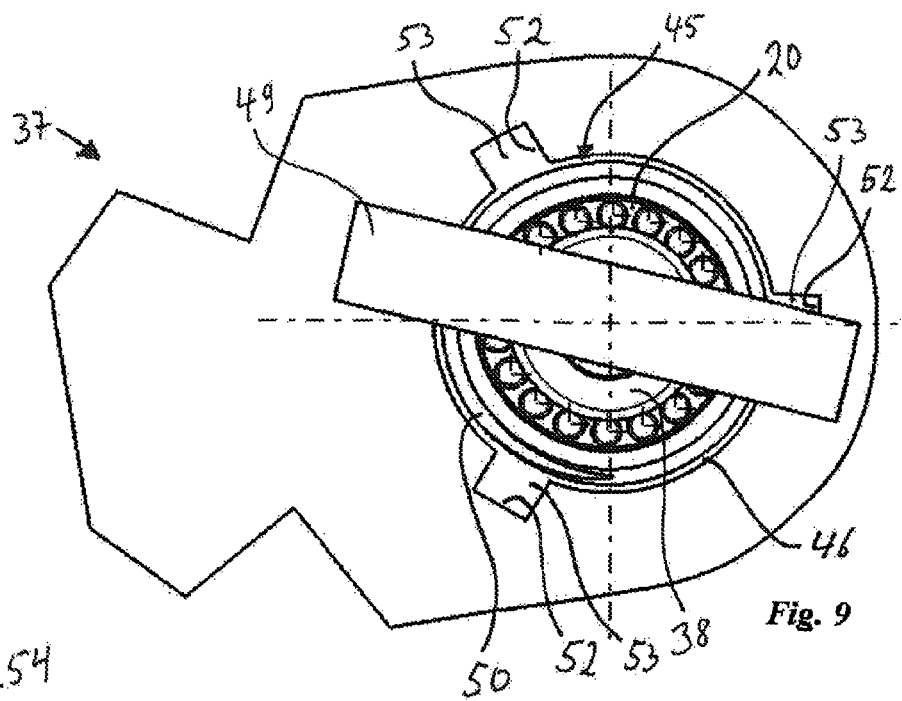
Figure 10:
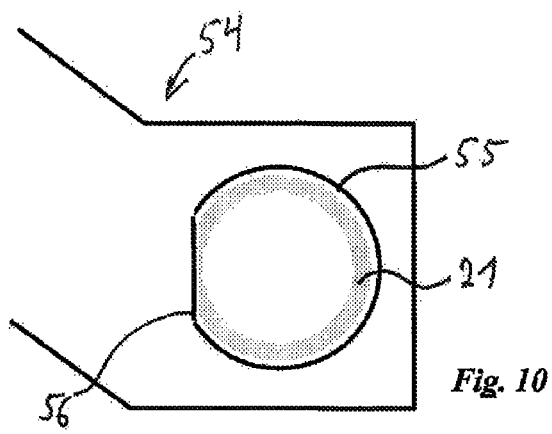
Figure 11:
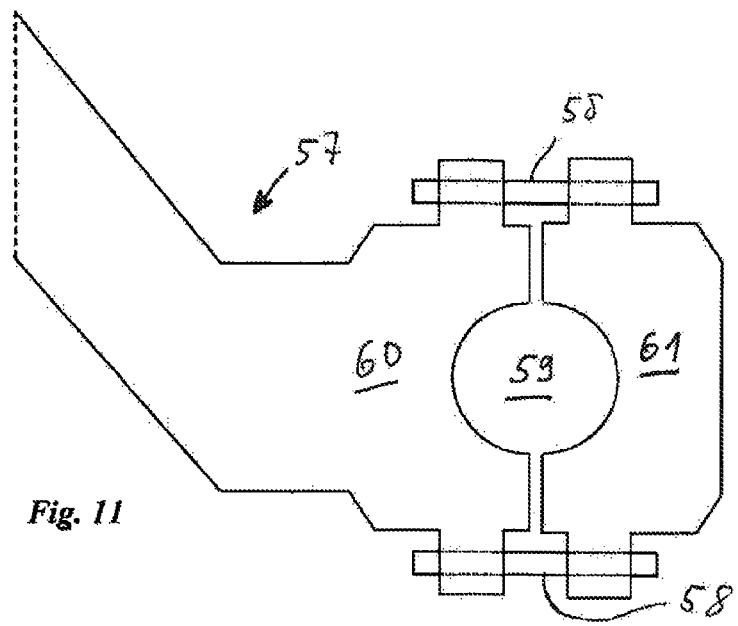
Figure 12:
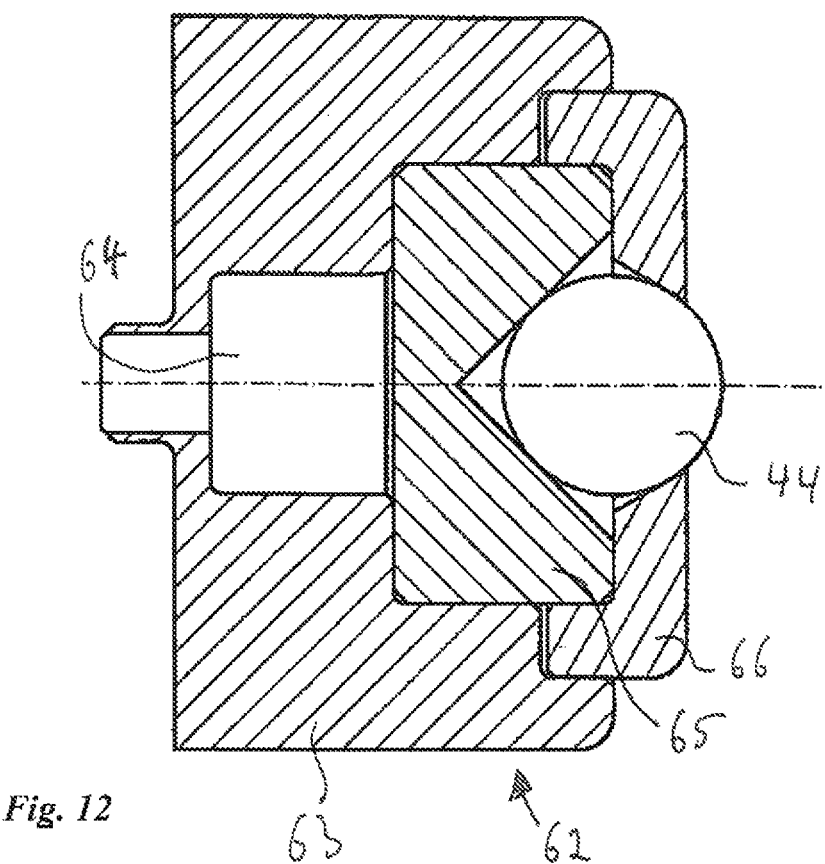

Exemplary embodiments of the invention will be explained hereinbelow on the basis of figures, in which, schematically:

FIG. 1: shows a deflection roller held via supporting arms on a cross-member,

FIG. 2: shows a portion of a cross-member with a floating bearing and a counterbody unit, FIG. 3: shows the counterbody unit as shown in FIG. 2 in a perspective view, FIG. 4: shows a displacement unit belonging to the floating bearing, FIG. 5: shows a roller journal on a deflection roller with a rolling bearing, FIG. 6: shows a roller journal on a deflection roller with a plain bearing, FIG. 7: shows part of a supporting arm with a bar element for rolling bearing clamping, FIG. 8: shows, in cross section, part of a supporting arm with a wedge ring for rolling bearing clamping, FIG. 9: shows rolling bearing clamping as shown in FIG. 8 in a plan view, FIG. 10: shows part of a supporting arm with a chamfer in a bearing receptacle, FIG. 11: shows part of a supporting arm with tie rods for rolling bearing clamping, and FIG. 12: shows a structure for assembling an impact body.

FIG. 1 schematically shows a deflection roller 3 mounted rotatably on two supporting arms 1 and 2. The supporting arm 2 on the right is mounted on a cross-member 6 via a locating bearing 4 and the supporting arm 1 on the left is mounted on the cross-member 6 via a floating bearing 5.

FIG. 2 shows a certain portion of the cross-member 6 in an exemplary embodiment in the region of the floating bearing 5. The floating bearing 5 comprises a floating bearing housing 7, in which a displacement unit 8 is arranged such that it can be displaced parallel to the cross-member 6.

FIG. 4 shows a perspective view of the displacement unit 8, which is supported on rollers 9 in the floating bearing housing 7. The supporting arm 1 shown on the left in FIG. 1 is fixed to an arm mount 10.

A stabilization unit 11, which interacts with the floating bearing 5 via the supporting arm 1, is moreover provided on the cross-member 6. The stabilization unit 11 is shown on an enlarged scale in a perspective view in FIG. 3. The stabilization unit 11 firstly comprises an elastic counterelement 12, which has a base unit 13, a spring unit 14 and also a supporting arm stop element 15. The elastic counterelement 13 is arranged such that it can be adjusted in the direction of its longitudinal extent within the stabilization unit 11. The adjustability can be provided, for example, by way of a spindle drive (not shown here). In the fully assembled state, the supporting arm stop element 15—unlike that shown in FIG. 2—rests against the supporting arm 1. The supporting arm stop element 15 can be displaced in a longitudinal direction counter to the force of the spring unit 14 in the direction of the base unit 13 of the elastic counterelement 12. The elastic counterelement 12, with the spring force of its spring unit 14, therefore counteracts a movement of the supporting arm 1 which increases the distance between the supporting arms 1 and 2, but at the same time allows for an increase in this distance between the supporting arms 1 and 2 on account of linear expansion of the deflection roller 3.

The elastic counterelement 12 therefore stabilizes the supporting arm 1 in its position in particular during the heating phase, in which the entire device is brought to temperatures close to the bath temperature to be expected. The deflection roller 3, which butts via an impact body 16 (see FIG. 5) merely against a stop plate 18 arranged on a securing bracket 17 of the supporting arm 3, is secured in the axial direction by the action of the elastic counterelement 12.

Once the heating process for the device as a whole has been concluded, it is also the case that no significant additional linear expansion of the deflection roller 3 is to be expected by virtue of the dipping into the molten bath. For this purpose, a limit stop element 19 is provided on the stabilization unit 11 and is engaged, for example via a further spindle drive element (not shown here), against the supporting arm 1 once heating has been concluded or is already moved into a suitable position beforehand, such that a further increase in the distance between the supporting arms 1 and 2 is prevented.

FIG. 5 shows an exemplary mounting of the deflection roller 3 with a rolling bearing 20, the outer ring 21 of which is fixed to the associated supporting arm 1, of which merely the securing bracket 17 is visible in FIG. 5. The mounting on the further supporting arm 2 (see FIG. 1) has a corresponding appearance. An inner ring 22 of the rolling bearing 20 surrounds a metallic roller journal 23 of the deflection roller 3. The outer ring 21, the inner ring and the rolling body 24 of the rolling bearing 20 are ceramic. On account of the considerably lower coefficient of expansion of the ceramic compared to the metal of the roller journal 23, a bearing gap 25 is provided in the radial direction between the roller journal 23 and the inner ring of the rolling bearing 22. When the deflection roller 3 has been dipped in, the roller journal 23 and the rolling bearing 20 are surrounded by hot molten metal. The inner ring 22 of the rolling bearing 20 is arranged in a circumferential groove 26, which is formed by limit disks 27 and 28. The limit disks 27 and 28 can be metallic or ceramic. A gap remains in each case between the limit disks 27 and 28 and the inner ring 22 and is filled with an elastic sealing disk 29 and 30 in order to prevent the admission of the molten metal to the bearing gap 25 and to thereby seal off the latter.

The, for example ceramic, impact body 16 is provided at the front end of the roller journal 23 and, in the present example, is hemispherical. The impact body 16 is in contact with the stop plate 18, which consists of a particularly wear-resistant metallic or ceramic material and is fixed to the securing bracket 17 of the supporting arm 1 (see FIG. 1).

The floating bearing 5, together with the elastic counterelement 12 (see FIG. 1), ensures that the supporting arm 1 rests by way of its stop plate 18 against the impact body 16. If there is then a temperature-induced expansion of the deflection roller 3, the impact body 16 presses via the stop plate 18 onto the supporting arm 1, which is thereby displaced to the left in FIG. 1. The floating bearing 5 permits this movement counter to the resistance of the elastic counterelement 12. Upon cooling, the elastic counterelement 12 ensures that the supporting arm 1 follows a contraction of the deflection roller 3. The deflection roller 3 is therefore fixed sufficiently between the supporting arms 1 and 2 in the axial direction in order to prevent undesirable axial movements of the deflection roller 3 between the supporting arms 1 and 2, for example during transportation of the device as a whole.

FIG. 6 shows an arrangement similar to that in FIG. 5, but with the rolling bearing 20 being replaced by a plain bearing 31. The plain bearing 31 consists of a plain bearing shell 32 and a plain bearing inner ring 33, at least the plain bearing inner ring 33 consisting of a ceramic.

For the rest, FIGS. 6 and 5 correspond to one another, and therefore reference is made to the description in relation to FIG. 5 owing to the further reference signs.

It is not shown in FIG. 5 how the rolling bearing 20 is held in the supporting arm 1 (see FIG. 1). The supporting arm 1 generally consists of metal, whereas the rolling bearing 20 is preferably produced entirely from ceramic. Since, because of this, there are considerable differences in the coefficients of expansion of the rolling bearing 20 and the supporting arm 1, special provisions need to be made to fix the rolling bearing 20 in the supporting arm 1.

FIGS. 7 to 11, then, schematically show different variants of the rolling bearing fixing, in which the rolling bearing 3 is fixed either by a non-positive lock or by a positive lock.

FIG. 7 schematically shows a first supporting arm variant 34, in which the rolling bearing 20 is fixed by means of a bar-shaped clamping element 35. The clamping element 35 has a higher coefficient of thermal expansion than the surrounding supporting arm material. The material of the clamping element 35 is thus to be selected in such a way that the clamping element 35 presses the rolling bearing outer ring 21 against the wall region 36, lying opposite the clamping element 35, of the bearing receptacle of the supporting arm 34 which receives the rolling bearing 20, without crushing the rolling bearing outer ring 21.

FIGS. 8 and 9 schematically show a second supporting arm variant 37, in which a deflection roller variant 38 is mounted via the rolling bearing 20. The lower block 40 of an impact body mount 41 is fastened to a roller journal 39 of the deflection roller variant 38 by means of a screw 42. In this case, the lower block 40 simultaneously serves as a lateral limit for the groove which receives the inner ring 22 of the rolling bearing 20. FIG. 8 does not depict the gaps shown in FIGS. 5 and 6 (radial bearing gap 25 and axial gaps filled with elastic sealing disks 29 and 30), but these are in actual fact also provided for the exemplary embodiment shown in FIG. 8.

The impact body mount 41 furthermore comprises an impact body receptacle 67 arranged in the lower block 40 and a fixing element 43, which can be screwed by way of an external thread into an internal thread of the lower block 40 in order to clamp a spherical impact body 44 against the impact body mount 41. The roller journal 39 and the rolling bearing 20 are accommodated in a bearing receptacle 45 of the second supporting arm variant 37. An annular wedge element 46 having a constant external radius is arranged between the bearing outer ring 21 and the wall of the bearing receptacle 45. The wedge element 46 comprises an axially running wedge piece 47 and a radially oriented end piece 48. With a constant external diameter, the internal diameter of the wedge piece 47 increases slightly from the end piece 48 toward the other, opposite end. The wedge piece 47 bridges the distance between the bearing outer ring 21 and the inner wall of the bearing receptacle 45 of the second supporting arm variant 37. If the distance between the wall of the bearing receptacle 45 and the bearing outer ring 21 grows on account of the greater thermal linear expansion of the second supporting arm variant 37, the wedge element 46 can slide in the axial direction, in order to maintain the clamping of the bearing outer ring 21 in the bearing receptacle 45.

A securing bracket 49 of the second supporting arm variant 37 spans a spring 50, which is tensioned between the securing bracket 49 and the end piece 48 of the wedge element 46, such that the spring 50 causes a moving up of the wedge element 46 as soon as the distance between the bearing outer ring 21 and the inner wall of the bearing receptacle 45 increases. The magnitude of the force acting on the wedge element 46 from the spring 50 has to be such that firstly the moving up described above is ensured, but secondly it is made possible for the wedge element 46 to slide back upon cooling of the second supporting arm variant, in order to prevent crushing of the rolling bearing 20 upon cooling of the device as a whole. A suitable shape of the wedge element 46 can be used to make it possible for the wedge element to slide back, e.g. with a wedge angle which is greater than the self-locking angle at the given boundary conditions.

If the second supporting arm variant 37 has been installed in the device as a whole, an elastic counterelement (for example the counterelement 12 shown in FIG. 2) will act on the second supporting arm variant 37, such that, when the device has been mounted completely, the impact body 44 rests against a stop plate 51 of the securing bracket 49. In this way, the deflection roller variant 38 is fixed sufficiently between the supporting arms. FIG. 8 shows, by contrast, a pre-assembly state, in which the impact body 44 is at a distance from the stop plate 51.

FIG. 9 shows a lateral plan view of the second supporting arm variant 37. The spring 50 can be seen beneath the securing bracket 49. The bearing receptacle 45 of the second supporting arm variant 37 has three grooves 52, which each receive correspondingly shaped extensions 53 of the wedge element 46. This prevents twisting of the wedge element in the bearing receptacle 45.

FIG. 10 shows a third supporting arm variant 54, which has a bearing receptacle 55 with a chamfer 56. The outer ring of the rolling bearing 20 (shown only schematically here) has a corresponding chamfer, such that, although the rolling bearing outer ring 21 is no longer clamped all around on account of the expansion of the bearing receptacle 55 at higher temperatures, the chamfer 56 prevents spinning of the rolling bearing in the third supporting arm variant 54. FIG. 10 shows this variant only in a schematically fundamental illustration.

FIG. 11 shows a fourth supporting arm variant 57, which provides for clamping of the rolling bearing (not shown here) by means of two tie rod bars 58. The tie rod bars 58 should have a coefficient of thermal expansion which matches to the greatest possible extent, ideally is identical to, that of the rolling bearing (not shown here). Therefore, the tie rod bars 58 could consist, for example, of the same material, for example of ceramic, as the rolling bearing. Therefore, the thermally induced expansion of a rolling bearing receptacle 59 formed by two separate parts 60 and 61 of the fourth supporting arm variant 57 corresponds substantially to the thermal linear expansion of the rolling bearing itself, at any rate in the longitudinal direction of the tie rod bars 58.

FIG. 12, finally, shows in detail a variant of an impact body mount 62 with a spherical impact body 44. The lower block 63 has a receptacle 64 for a screw (not shown here), which can be used to fix the lower block 63 to a roller journal of a deflection roller. An impact body receptacle 65 is fixed in the lower block 63, for example by a screwed connection (not shown here). A fixing element 66, which can be screwed into the lower block 63 by way of a threaded connection (not shown here), can be used to fix the impact body 44 on the impact body receptacle 65. The screwed connections permit simple reassembly of an impact body 44, which represents a wearing part.

LIST OF REFERENCE SIGNS

1 Supporting arm
2 Supporting arm
3 Deflection roller
4 Locating bearing
5 Floating bearing
6 Cross-member
7 Floating bearing housing
8 Displacement unit
9 Roller
10 Arm mount
11 Stabilization unit
12 Elastic counterelement
13 Base unit
14 Spring element
15 Supporting arm stop element
16 Impact body
17 Securing bracket
18 Stop plate
19 Limit stop element
20 Rolling bearing
21 Outer ring
22 Inner ring
23 Roller journal
24 Rolling body
25 Bearing gap
26 Groove
27 Limit disk
28 Limit disk
29 Elastic sealing disk
30 Elastic sealing disk
31 Plain bearing
32 Plain bearing shell
33 Plain bearing inner ring
34 First supporting arm variant
35 Clamping element
36 Wall region
37 Second supporting arm variant
38 Deflection roller variant
39 Roller journal
40 Lower block
41 Impact body mount
42 Screw
43 Fixing element
44 Impact body
45 Bearing receptacle
46 Annular wedge element
47 Wedge piece
48 End piece
49 Securing bracket
50 Spring
51 Stop plate
52 Groove 53 Extension of the wedge element
54 Third supporting arm variant
55 Bearing receptacle
56 Chamfer
57 Fourth supporting arm variant
58 Tie rod bars
59 Rolling bearing receptacle
60 Supporting arm part
61 Supporting arm part
62 Impact body mount
63 Lower block
64 Receptacle for screw
65 Impact body receptacle
66 Fixing element
67 Impact body receptacle

The invention claimed is:

1. A device for strip guidance in a hot medium, comprising a deflection roller (3, 38) which is mounted on supporting arms (1, 2, 34, 37, 54, 57) and a carrier device holding the supporting arms (1, 2, 34, 37, 54, 57), wherein one of the supporting arms (1, 2, 34, 37, 54, 57) is mounted on a carrier device by means of a floating bearing (5), wherein the floating bearing (5) allows the supporting arm mounted thereby on the carrier device to move parallel to the longitudinal direction of the deflection roller (3, 38), and wherein an elastic counterelement (12) acting parallel to the longitudinal direction of the deflection roller (3, 38) on the supporting arm (1, 2, 34, 37, 54, 57) mounted on the floating bearing (5) is present and counteracts an increasing distance between the supporting arms (1, 2, 34, 37, 54, 57).

2. The device as claimed in claim 1, wherein the carrier device is a cross-member (6).

3. The device as claimed in claim 1, including a fixing means for fixing, on the carrier device, the supporting arm that is (1, 2, 34, 37, 54, 57) mounted on the carrier device by means of the floating bearing (5).

4. The device as claimed in claim 1, wherein a supporting arm stop element (15) is present for limiting the movement of the supporting arm (1, 2, 34, 37, 54, 57) mounted on the floating bearing (5) wherein the position of the supporting arm stop element is adjustable.

5. The device as claimed in claim 1, wherein the deflection roller (3, 38) is mounted on the supporting arms (1, 2, 34, 37, 54, 57) via roller journals (23, 39) and wherein journal bearings (20, 31) and roller stop elements (18) for the roller journals (23, 39) are provided on the supporting arms (1, 2, 34, 37, 54, 57).

6. The device as claimed in claim 5, wherein at least one of the journal bearings (20, 31) is a rolling bearing.

7. The device as claimed in claim 5, wherein at least one of the journal bearings (20, 31) is a plain bearing.

8. The device as claimed in claim 5, wherein at least one of the journal bearings (20, 31) is entirely ceramic.

9. The device as claimed in claim 5, wherein a bearing gap (25) is provided in a radial direction between the respective journal bearings (20, 31) and the roller journals (23, 39) and the bearing gap (25) is sealed off against the penetration of molten material.

10. The device as claimed in claim 9, wherein at least one elastic sealing disk (29, 30) positioned in the axial direction on the journal bearing (20, 31) serves for sealing off the bearing gap (25).

11. The device as claimed in claim 10, wherein the at least one elastic sealing disk (29) comprises graphite or consists of graphite.

12. The device as claimed in claim 5, wherein impact bodies (16, 44) are fixed releasably to the roller journals for an axially oriented impact against the supporting arms (1, 2, 34, 37, 54, 57).

13. The device as claimed in claim 12, wherein one or more screwed connections are provided for the releasable fixing of the impact bodies (16, 44).

14. The device as claimed in claim 5, wherein at least one of the journal bearings (20, 31) is secured in the supporting arm (1, 2, 34, 37, 54, 57) against release from a bearing receptacle (45, 55) of the supporting arm (1, 2, 34, 37, 54, 57) by means of a non-positive lock or positive lock which engages on the outer edge of the journal bearing (20, 31).

15. The device as claimed in claim 14, wherein at least one of the journal bearings (20, 31) is secured by means of a clamping body (35, 46) which engages on the at least one of the journal bearings (20, 31) and on the supporting arm (1, 2, 34, 37, 54, 57) holding the at least one of the journal bearings (20, 31).

16. The device as claimed in claim 15, wherein the clamping body (35, 46) has a higher coefficient of thermal expansion compared to the material of the supporting arm (1, 2, 34, 37, 54, 57).

17. The device as claimed in claim 16, wherein the clamping body (35, 46) has a bar shape.

18. The device as claimed in claim 15, wherein the clamping body (35, 46) has an annular shape.

19. The device as claimed in claim 18, wherein the annular clamping body (35, 46) comprises an annular wedge piece (47) of wedge-shaped crosssection with a thickness which decreases in the axial direction.

20. The device as claimed in claim 19, including an elastic spring element (50) acting on the clamping body (35, 46) in the axial direction.

21. The device as claimed in claim 14, wherein at least one of the journal bearings (20, 31) is secured by means of at least one tie rod (58).

22. The device as claimed in claim 21, wherein the at least one tie rod acts between two separate supporting arm parts (60, 61) which form the bearing receptacle (45, 55) and has a lower coefficient of thermal expansion than the material of the supporting arm (1, 2, 34, 37, 54, 57).

23. The device as claimed in claim 14, wherein the bearing receptacle (45, 55) has a chamfer acting on at least one of the journal bearings (20, 31) in a positive-locking manner.

24. The device as claimed in claim 1, wherein at least one of the journal bearings (20, 31) is unencapsulated with respect to the hot medium.

* * * * *